No. 295,931

UNITED STATES PATENT OFFICE.

MONROE McNAMARA, OF MEXICO, MISSOURI.

MANUFACTURE OF ARTIFICIAL STONE.

SPECIFICATION forming part of Letters Patent No. 295,931, dated April 1, 1884.

Application filed December 26, 1883. (No specimens.)

*To all whom it may concern:*

Be it known that I, MONROE McNAMARA, a citizen of the United States, residing at Mexico, in the county of Audrain and State of Missouri, have invented certain new and useful Improvements in the Manufacture of Artificial Stone; and I do hereby declare the following to be a full, clear, and exact description of the invention, such as will enable others skilled in the art to which it appertains to make and use the same.

My invention relates to improvements in the manufacture of artificial stone for various purposes, and which is more especially designed for use in constructing or, preferably, molding burial-vaults or burial caskets, to contain the usual coffin or casket of wood or metal.

The invention consists, essentially, in a new composition of matter, in which the following ingredients or substances are employed, to wit: Portland cement, sand, ground or pulverized or comminuted glass, plaster-of-paris, pitch, paper-pulp, sal-soda, litharge, and alum.

In carrying out my invention, I take of Portland cement, fifty pounds; of sand, nine and one-fifth pounds; of glass, (ground, pulverized, or comminuted,) nine and one-fifth pounds; of plaster-of-paris, nine and one-fifth pounds; of pitch, nine and one-fifth pounds; of paper-pulp, nine and one-fifth pounds; of sal-soda, one pound; of litharge, two pounds; of alum, one pound. I take the sand and glass, together with the paper-pulp, and mix them intimately together by means of any of the well-known machines now employed for this purpose, and when thoroughly incorporated I heat the mixture sufficiently to permit of the addition thereto and intimate mixture of the pitch. I next take the sal-soda, litharge, and alum and mix them together in sufficient water to form, when combined with all the other substances, a plastic mass. The mixture or solution of sal-soda, litharge, and alum is then added to the combined sand, glass, paper-pulp, and pitch, and after intimate admixture the cement is added, and, finally, the plaster-of-paris.

I prefer to add the cement and plaster-of-paris gradually to the mixture of paper-pulp, sand, glass, pitch, sal-soda, litharge, and alum, to obtain a more homogeneous mass. I thus obtain a composition of matter that will admit of being molded into various forms, and that will answer all the purposes of natural stone.

Of course, it will be understood that I do not limit myself to the exact proportions of substances as above set forth, as these may be varied within certain limits, and will in a measure depend upon the hardness the cement is to acquire, as well as the rapidity with which it is to set or harden.

What I claim, and desire to secure by Letters Patent, is—

The herein-described composition of matter, consisting of Portland cement, sand, ground or pulverized or comminuted glass, plaster-of-paris, pitch, paper-pulp, sal-soda, litharge, and alum, in or about in the proportions set forth.

In testimony whereof I affix my signature in presence of two witnesses.

MONROE McNAMARA.

Witnesses:
W. H. KENNON,
X. J. PINDALL.